United States Patent
Sawhney et al.

(10) Patent No.: US 9,116,768 B1
(45) Date of Patent: Aug. 25, 2015

(54) SYSTEMS AND METHODS FOR DEPLOYING APPLICATIONS INCLUDED IN APPLICATION CONTAINERS

(71) Applicant: Symantec Corporation, Mountain View, CA (US)

(72) Inventors: Sanjay Sawhney, Cupertino, CA (US); Petros Efstathopoulos, Los Angeles, CA (US); Daniel Marino, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/549,218

(22) Filed: Nov. 20, 2014

(51) Int. Cl.
*G06F 9/445* (2006.01)

(52) U.S. Cl.
CPC ..................................... *G06F 8/60* (2013.01)

(58) Field of Classification Search
CPC .......................................................... G06F 8/60
USPC .................................................. 717/174–178
See application file for complete search history.

(56) References Cited

U.S. PATENT DOCUMENTS

| | | | | |
|---|---|---|---|---|
| 5,530,758 | A * | 6/1996 | Marino et al. | 713/150 |
| 6,092,202 | A * | 7/2000 | Veil et al. | 726/27 |
| 6,449,720 | B1 * | 9/2002 | Sprague et al. | 713/171 |
| 6,968,539 | B1 * | 11/2005 | Huang et al. | 717/115 |
| 8,887,152 | B1 * | 11/2014 | Chen et al. | 717/174 |
| 2004/0015958 | A1 * | 1/2004 | Veil et al. | 717/174 |
| 2005/0039171 | A1 * | 2/2005 | Avakian et al. | 717/127 |
| 2010/0199325 | A1 * | 8/2010 | Raleigh | 726/3 |
| 2014/0006347 | A1 * | 1/2014 | Qureshi et al. | 707/621 |
| 2014/0007048 | A1 * | 1/2014 | Qureshi et al. | 717/110 |
| 2014/0229607 | A1 * | 8/2014 | Jung et al. | 709/224 |
| 2014/0250433 | A1 * | 9/2014 | Stekkelpak et al. | 717/176 |
| 2014/0331279 | A1 * | 11/2014 | Aissi et al. | 726/1 |

OTHER PUBLICATIONS

Bottomley, James, "What is All the Container Hype?" Apr. 2014, Parallels, p. 1-5.*
Anubhav Savant, et al; Systems and Methods for Modifying Applications Without User Input; U.S. Appl. No. 14/445,704, filed Jul. 29, 2014.
"Build, Ship and Run Any App, Anywhere", https://www.docker.com/, as accessed on Sep. 30, 2014, Docker, Inc., (Dec. 21, 1996).

(Continued)

*Primary Examiner* — Qing Chen
(74) *Attorney, Agent, or Firm* — ALG Intellectual Property, LLC

(57) ABSTRACT

The disclosed computer-implemented method for deploying applications included in application containers may include (1) identifying an application container that includes an application and facilitates transferring the application to a deployment environment, (2) performing a reconnaissance analysis on the deployment environment by identifying one or more properties of the deployment environment, (3) determining, based at least in part on the reconnaissance analysis, that the deployment environment meets a predetermined threshold of requirements for securely executing the application, and then (4) transferring the application included in the application container to the deployment environment in response to determining that the deployment environment meets the predetermined threshold. Various other methods, systems, and computer-readable media are also disclosed.

20 Claims, 6 Drawing Sheets

(56) References Cited

OTHER PUBLICATIONS

Vaughan-Nichols, Steven J., "What is Docker and why is it so darn popular?", http://www.zdnet.com/what-is-docker-and-why-is-it-so-darn-popular-7000032269/, as accessed on Sep. 30, 2014, ZDNet, CBS Interactive, (Aug. 4, 2014).

Nathan Evans, et al; Systems and Methods for Performing Application Container Introspection; U.S. Appl. No. 14/645,452, filed Mar. 12, 2015.

Kumar, Arun, "HTTPS Security and Spoofing—Who is that Man in the Middle?", http://www.thewindowsclub.com/https-security-spoofing-man-in-the-middle, as accessed Jan. 20, 2015, (Aug. 27, 2014).

"Proposal: container introspection #8427", https://github.com/docker/docker/issues/8427, as accessed Jan. 20, 2015, GitHub, Inc., (Oct. 6, 2014).

Nakhimovsky, Greg, "Building Library Interposers for Fun and Profit", http://www.drdobbs.com/building-library-interposers-for-fun-and/184404926, as accessed Jan. 20, 2015, (Nov. 1, 2001).

Brian Witten, et al; Systems and Methods for Preventing Code from Executing on Untrustworthy Platforms; U.S. Appl. No. 14/736,323; filed Jun. 11, 2015.

"Docker", https://www.docker.com/whatisdocker, as accessed on Feb. 27, 2015, (Jun. 11, 2014).

"Trusted Platform Module (TPM) Summary", http://www.trustedcomputinggroup.org/resources/trusted_platform_module_tpm_summary, as accessed Feb. 27, 2015, (Sep. 27, 2012).

"Trusted execution environment", https://en.wikipedia.org/wiki/Trusted_execution_environment, as accessed Feb. 27, 2015, Wikipedia, (on or before Feb. 27, 2015).

"Trusted Computing Group (TCG)", https://www.trustedcomputinggroup.org/, as accessed Feb. 27, 2015, (Apr. 10, 2003).

"Unified Extensible Firmware Interface Forum (UEFI)", http://www.uefi.org/, as accessed Feb. 27, 2015, (May 24, 2005).

"Code signing", https://en.wikipedia.org/wiki/Code_signing, as accessed Feb. 27, 2015, Wikipedia, (Sep. 13, 2006).

"Samsung KNOX™ —White Paper: An Overview of Samsung KNOX™", http://www.samsung.com/my/business-images/resource/white-paper/2013/11/Samsung_KNOX_whitepaper_An_Overview_of_Samsung_KNOX-0.pdf, as accessed Feb. 27, 2015, Enterprise Mobility Solutions, Samsung Electronics Co. Ltd., (Apr. 2013).

Hoekstra, Matthew, "Intel® SGX for Dummies (Intel® SGX Design Objectives)", https://software.intel.com/en-us/blogs/2013/09/26/protecting-application-secrets-with-intel-sgx, as accessed Feb. 27, 2015, Intel, (Sep. 26, 2013).

"Trustonic", https://www.trustonic.com/, as accessed Feb. 27, 2015, (Dec. 31, 2012).

"Trusted Network Connect", https://en.wikipedia.org/wiki/Trusted_Network_Connect, as accessed Feb. 27, 2015, Wikipedia, (Sep. 13, 2006).

* cited by examiner

SYSTEMS AND METHODS FOR DEPLOYING APPLICATIONS INCLUDED IN APPLICATION CONTAINERS

BACKGROUND

Application container technologies may enable users to deploy and execute applications in a variety of computing environments and/or on multiple computing devices. For example, an application container may allow a user to partition a single application and seamlessly transport the application from a desktop computer to a laptop or mobile device. Application containers may be useful in a variety of contexts, such as developing and testing applications and/or transporting work-related applications to personal computing systems.

Unfortunately, while increasing the usability and flexibility of certain applications, traditional application containers may also increase the risk of data leaks and other security threats. For example, conventional application container technologies may allow users to execute applications that handle sensitive information outside of the control of IT administrators and/or outside of a trusted network. As an example, an employee may utilize an application container to execute a work-related application (containing, e.g., financial records, client data, etc.) on a home computing device. In addition, a user may store an instance of an application in an application container and upload the application to a cloud-based platform that is potentially vulnerable to access by unauthorized parties. As such, the instant disclosure identifies and addresses a need for improved systems and methods for deploying applications included in application containers.

SUMMARY

As will be described in greater detail below, the instant disclosure describes various systems and methods for deploying applications included in application containers by analyzing a potential deployment environment to determine whether the deployment environment is capable of securely executing an application before transferring the application to the deployment environment. Once transferred, the application may be monitored and/or the application's actions may be restricted to ensure that the application complies with a deployment policy. In one example, a computer-implemented method for accomplishing such a task may include (1) identifying an application container that includes an application and facilitates transferring the application to a deployment environment, (2) performing a reconnaissance analysis on the deployment environment by identifying one or more properties of the deployment environment, (3) determining, based on the reconnaissance analysis, that the deployment environment meets a predetermined threshold of requirements for securely executing the application, and (4) transferring the application included in the application container to the deployment environment in response to determining that the deployment environment meets the predetermined threshold.

In some examples, performing the reconnaissance analysis on the deployment environment may include shipping a reconnaissance agent to the deployment environment. Additionally or alternatively, performing the reconnaissance analysis on the deployment environment may include monitoring the deployment environment via a daemon running in the background of the deployment environment.

In some embodiments, the property of the deployment environment may include hardware and/or software operating within the deployment environment. The property of the deployment environment may also include network connections and/or services accessible by the deployment environment. Additionally or alternatively, the property may include a geographic location of the deployment environment.

In some examples, determining that the deployment environment meets the predetermined threshold may include comparing the property of the deployment environment with a deployment policy and determining, based at least in part on the comparison of the property with the deployment policy, that the deployment environment meets the predetermined threshold. Additionally or alternatively, determining that the deployment environment meets the predetermined threshold may include identifying at least one security measure that the deployment environment is to implement prior to executing the application included in the application container. In this example, determining that the deployment environment meets the predetermined threshold may also include ensuring that the deployment environment implements the security measure prior to executing the application included in the application container.

In some embodiments, transferring the application included in the application container to the deployment environment may include receiving a communication from a deployment agent running within the deployment environment that indicates that the deployment environment meets the predetermined threshold. Such embodiments may include transferring the application to the deployment environment in response to receiving the communication.

In some examples, the method may further include regulating the application included in the application container after transferring the application to the deployment environment. In these examples, regulating the application included in the application container may include restricting the application's access to a network connection, access to the application by an external service, data transferred to the application from outside the application container, and/or data transferred from the application to outside the application container. Additionally or alternatively, regulating the application included in the application container may include directing the application to comply with a deployment policy.

In some embodiments, the method may further include performing an additional reconnaissance analysis on at least one additional deployment environment. In such embodiments, the method may also include storing information obtained from the reconnaissance analysis performed on the deployment environment and the additional reconnaissance analysis performed on the additional deployment environment. Such embodiments may then include using the information obtained from both the reconnaissance analysis and the additional reconnaissance analysis to regulate at least one subsequent deployment of the application. In some examples, regulating the subsequent deployment of the application may include making a recommendation to a user of the application on how to deploy the application to a potential deployment environment.

In one embodiment, a system for implementing the above-described method may include (1) an identification module that identifies an application container that includes an application and facilitates transferring the application to a deployment environment, (2) a reconnaissance module that performs a reconnaissance analysis on the deployment environment by identifying one or more properties of the deployment environment, (3) a determination module that determines, based on the reconnaissance analysis, that the deployment environment meets a predetermined threshold of requirements for securely executing the application, and (4) a transfer module that transfers the application included in the application container to the deployment environment in response to determining that the deployment environment meets the predetermined threshold. In addition, the system may include at least one processor that executes the identification module, the reconnaissance module, the determination module, and the transfer module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify an application container that includes an application and facilitates transferring the application to a deployment environment, (2) perform a reconnaissance analysis on the deployment environment by identifying one or more properties of the deployment environment, (3) determine, based on the reconnaissance analysis, that the deployment environment meets a predetermined threshold of requirements for securely executing the application, and then (4) transfer the application included in the application container to the deployment environment in response to determining that the deployment environment meets the predetermined threshold.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
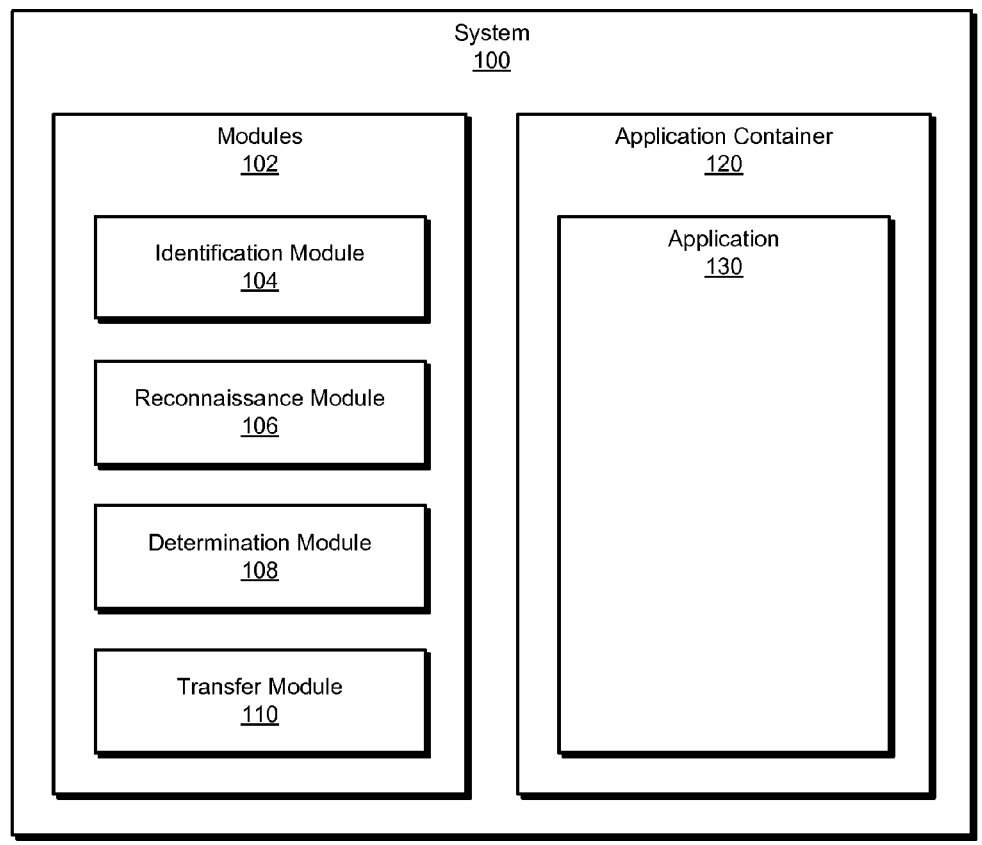
FIG. 1 is a block diagram of an exemplary system for deploying applications included in application containers.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for deploying applications included in application containers. As will be explained in greater detail below, by analyzing a potential deployment environment before deploying an application within an application container to the deployment environment, the systems and methods described herein may efficiently and accurately evaluate the deployment environment for performance and/or security deficiencies. For example, by identifying properties associated with the security capabilities of a deployment environment, the various systems and methods disclosed herein may determine whether the deployment environment meets the requirements of a deployment policy before permitting a user to execute an application included in an application container within the deployment environment. Moreover, the disclosed systems and methods may ensure the safe and secure execution of an application deployed within an application container by monitoring and/or restricting the actions performed by the application once the application has been deployed. As such, the systems and methods described herein may provide enterprises, IT administrators, etc., with enhanced and more efficient control over the deployment of applications to external computing environments.

Figure 2:
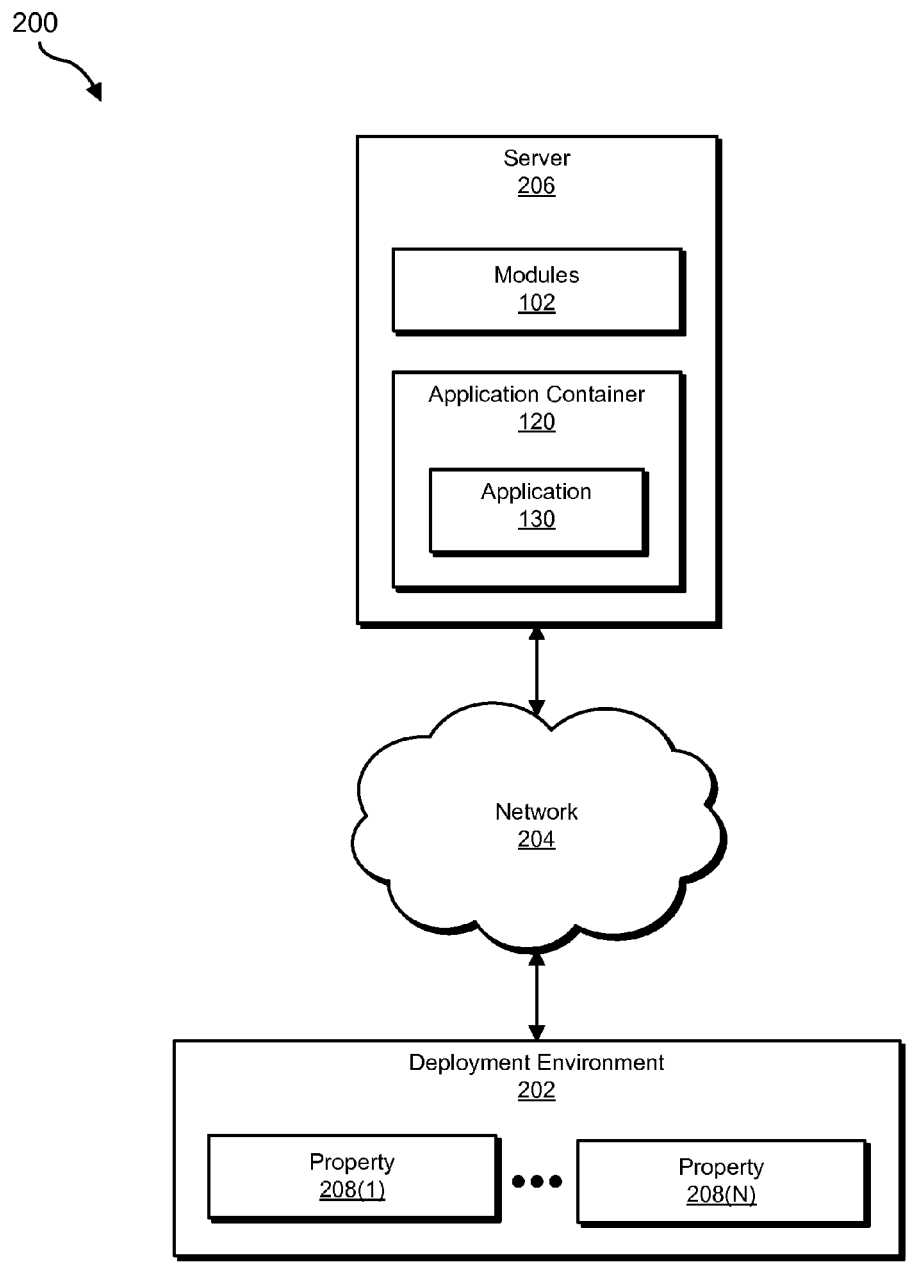
FIG. 2 is a block diagram of an additional exemplary system for deploying applications included in application containers.

The following will provide, with reference to FIGS. 1-2, detailed descriptions of exemplary systems for deploying applications included in application containers. Detailed descriptions of corresponding computer-implemented methods will also be provided in connection with FIG. 3. In addition, detailed descriptions of applications included in application containers deployed to deployment environments will be provided in connection with FIG. 4. Finally, detailed descriptions of an exemplary computing system and network architecture capable of implementing one or more of the embodiments described herein will be provided in connection with FIGS. 5 and 6, respectively.

FIG. 1 is a block diagram of an exemplary system 100 for deploying applications included in application containers. As illustrated in this figure, exemplary system 100 may include one or more modules 102 for performing one or more tasks. For example, and as will be explained in greater detail below, exemplary system 100 may include an identification module 104 that identifies an application container that includes an application and facilitates transferring the application to a deployment environment. Exemplary system 100 may also include a reconnaissance module 106 that performs a reconnaissance analysis on the deployment environment by identifying one or more properties of the deployment environment.

In addition, and as will be described in greater detail below, exemplary system 100 may include a determination module 108 that determines, based on the reconnaissance analysis, that the deployment environment meets a predetermined threshold of requirements for securely executing the application. Furthermore, exemplary system 100 may include a transfer module 110 that transfers the application included in the application container to the deployment environment in response to determining that the deployment environment meets the predetermined threshold. Finally, exemplary system 100 may include a regulation module 112 that regulates the application included in the application container after the application is transferred to the deployment environment. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., deployment environment 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more application containers, such as application container 120. In this example, application container 120 may include an application 130. The term "application," as used herein, generally refers to any type or form of software, file, and/or executable code that may be installed, run, deployed, and/or otherwise implemented on a computing system. Examples of applications include, without limitation, web browsers, operating systems, communication applications, word and number processing applications, gaming applications, security applications, cloud-based applications, and media applications.

In addition, the term "application container," as used herein, generally refers to any type or form of software partition that isolates an application from one or more additional applications running within an operating system. In some examples, application container 120 may only include a single application and any libraries or other dependent files (e.g., as opposed to a virtual machine, which may include an entire guest operating system). As such, application 130 included in application container 120 may be managed by a host operating system external to application container 120. In some examples, application 130 included in application container 120 may share a host operating system and/or kernel with one or more additional applications or application containers. Examples of application container 120 include, without limitation, DOCKER containers and Let Me Contain That For You (LMCTFY) containers.

In some embodiments, a user may deploy and/or ship application 130 included in application container 120 to a deployment environment. The term "deployment environment," as used herein, generally refers to any type or form of software and/or hardware-based computing platform capable of executing an application. Examples of deployment environments include, without limitation, mobile computing environments, workplace computing environments, home and/or personal computing environments, cloud-based computing environments, combinations of one or more of the same, and/or any additional type of computing environment. Once application 130 is deployed, a user may execute application 130 within the deployment environment (via, e.g., a driver, an engine, and/or other support software for the application container).

Exemplary system 100 in FIG. 1 may be implemented in a variety of ways. For example, all or a portion of exemplary system 100 may represent portions of exemplary system 200 in FIG. 2. As shown in FIG. 2, system 200 may include a deployment environment 202 in communication with a server 206 via a network 204. In one example, server 206 may be programmed with one or more of modules 102 in order to facilitate remotely analyzing deployment environment 202 and/or deploying application 130 included in application container 120 to deployment environment 202. Additionally or alternatively, deployment environment 202 may be programmed with one or more of modules 102 in order to directly identify properties of deployment environment 202 and/or facilitate executing application 130 within deployment environment 202.

As shown in FIG. 2, deployment environment 202 may have properties 208(1)-(N). The term "property," as used herein, generally refers to any type or form of characteristic, feature, or quality associated with a computing environment. In some examples, a property may describe or indicate the ability of a computing environment to safely execute an application (e.g., execute the application without allowing unauthorized parties access to information stored within the application). Additionally or alternatively, a property may describe or indicate the ability of a computing environment to provide the computing capabilities (e.g., processor speed, amount of memory, etc.) necessary to properly execute an application. Examples of properties 208(1)-(N) include, without limitation, hardware operating within the deployment environment (e.g., a type and/or version of a processor, graphics card, hard drive, etc.), software operating within the deployment environment (e.g., software capable of executing applications within application containers), the type of a network connection accessible by the deployment environment (e.g., a wired or wireless connection), the security of a network connection accessible by the deployment environment (e.g., a type of encryption used to encrypt data transferred via the network), services accessible by the deployment environment (e.g., cloud-based platforms, services used to execute applications included in application containers, etc.), a geographic location of the deployment environment (e.g., a country, state, IP address, etc.), combinations of one or more of the same, and/or any additional type of property that may indicate the ability of a deployment environment to securely execute an application.

In one embodiment, one or more of modules 102 from FIG. 1 may, when executed by at least one processor of deployment environment 202 and/or server 206, enable deployment environment 202 and/or server 206 to deploy applications included in application containers. For example, and as will be described in greater detail below, identification module 104 may cause deployment environment 202 and/or server 206 to identify application container 120 that includes application 130 and facilitates transferring application 130 to deployment environment 202. In addition, reconnaissance module 106 may cause deployment environment 202 and/or server 206 to perform a reconnaissance analysis on deployment environment 202 by identifying at least one property (e.g., one or more of properties 208(1)-(N)) of deployment environment 202. Next, determination module 108 may cause deployment environment 202 and/or server 206 to determine, based at least in part on the reconnaissance analysis, that deployment environment 202 meets a predetermined threshold of requirements for securely executing application 130. Transfer module 110 may then cause deployment environment 202 and/or server 206 to transfer application 130 included in application container 120 to deployment environment 202 in response to the determination that deployment environment 202 meets the predetermined threshold.

Deployment environment 202 generally represents any type or form of computing device capable of reading computer-executable instructions. Examples of deployment environment 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, cloud-computing platforms, combinations of one or more of the same, exemplary computing system 510 in FIG. 5, or any other suitable computing device.

Server 206 generally represents any type or form of computing device that is capable of deploying an application included in an application container. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between deployment environment 202 and server 206.

Figure 3:
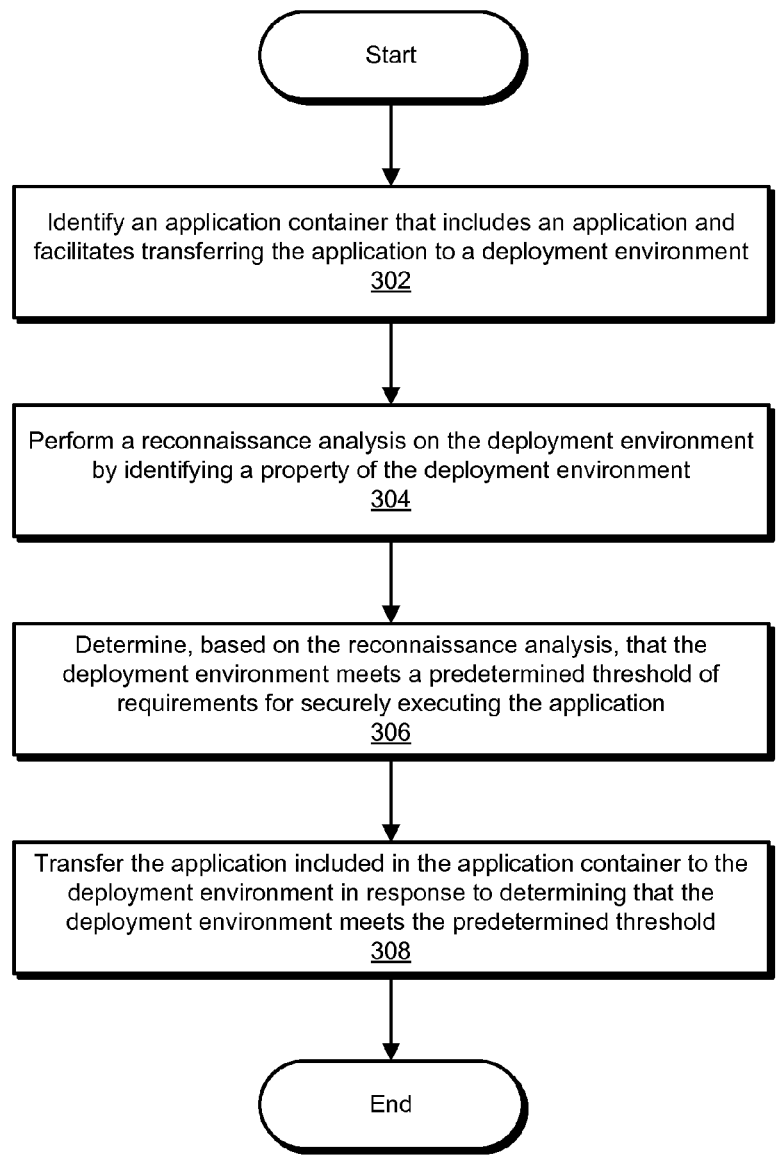
FIG. 3 is a flow diagram of an exemplary method for deploying applications included in application containers.

FIG. 3 is a flow diagram of an exemplary computer-implemented method 300 for deploying applications included in application containers. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify an application container that includes an application and facilitates transferring the application to at least one deployment environment. For example, identification module 104 may, as part of server 206 in FIG. 2, identify application container 120 that includes application 130 and facilitates transferring application 130 to deployment environment 202.

The systems described herein may perform step 302 in a variety of ways. In some examples, identification module 104 may identify application container 120 after application 130 has been included in application container 120. For example, identification module 104 may identify application container 120 after a user of application 130 has included application 130 in application container 120 in order to deploy application 130 to deployment environment 202.

In other examples, identification module 104 may identify a request to deploy application 130 to deployment environment 202 via application container 120. In these examples, identification module 104 may include application 130 in application container 120 in response to the request. In general, identification module 104 may identify application container 120 and/or application 130 at any point prior to an instance of application 130 being transferred to deployment environment 202 (e.g., while application container 120 and application 130 are hosted on server 206).

Returning to FIG. 3, at step 304 one or more of the systems described herein may perform a reconnaissance analysis on the deployment environment by identifying at least one property of the deployment environment. For example, reconnaissance module 106 may, as part of server 206 in FIG. 2, perform a reconnaissance analysis on deployment environment 202 by identifying properties 208(1)-(N) of deployment environment 202.

The term "reconnaissance analysis," as used herein, generally refers to any type or form of investigation, survey, or query that examines and/or identifies one or more properties of a deployment environment. In some examples, a reconnaissance analysis may be configured to discover a predetermined set of properties of a deployment environment (e.g., properties relating to the computing capabilities and/or security of a deployment environment). In addition, a reconnaissance analysis may be performed remotely (e.g., by querying a deployment environment via a network) or directly within a deployment environment (e.g., via an agent or software module running within the deployment environment).

Figure 4:
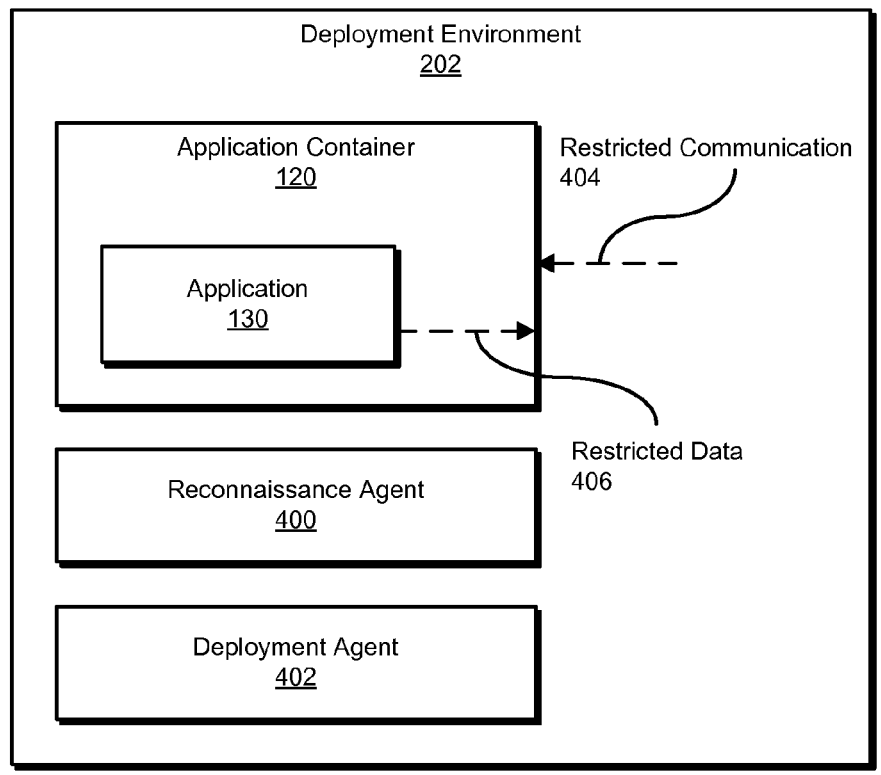
FIG. 4 is an illustration of an exemplary application included in an application container deployed in a deployment environment.

The systems described herein may perform step 304 in a variety of ways. In some examples, reconnaissance module 106 may perform the reconnaissance analysis on deployment environment 202 via a reconnaissance agent. As an example, FIG. 4 illustrates a reconnaissance agent 400 within deployment environment 202. In one embodiment, reconnaissance module 106 may ship reconnaissance agent 400 to deployment environment 202 from server 206 (or an additional server not illustrated in FIG. 2). For example, in response to the determination that a user has requested to deploy application 130 included in application container 120 to deployment environment 202, reconnaissance module 106 may send reconnaissance agent 400 to deployment environment 202. Reconnaissance agent 400 may then identify properties 208(1)-(N) of deployment environment 202 (e.g., by querying the operating system running within deployment environment 202).

In an exemplary embodiment, reconnaissance agent 400 may be included within application container 120. For example, application container 120 may represent a "super container" that is responsible for analyzing deployment environment 202 and/or regulating application 130 once application 130 has been deployed, in addition to facilitating the transfer of application 130 to deployment environment 202. In this example, reconnaissance module 106 may ship a shell of application container 120 that includes reconnaissance agent 400 but does not include application 130. The term "shell," as used herein, generally refers to any type or form of software, executable code, and/or collection of files included within an application container that performs functions not directly related to execution of an application within the application container. For example, a shell may include one or more agents configured to identify properties 208(1)-(N), communicate with server 206, and/or monitor data and communications distributed to or from application 120. By including reconnaissance agent 400 within the shell of application container 120, reconnaissance module 106 may perform the reconnaissance analysis without deploying application 130 before determining that deployment environment 202 is capable of securely executing application 130.

Alternatively, reconnaissance agent 400 may reside outside of application container 120. In this example, reconnaissance module 106 may ship the separate reconnaissance agent 400 to deployment environment 202 before shipping any portion of application container 120.

In other examples, reconnaissance module 106 may perform the reconnaissance analysis on deployment environment 202 without shipping reconnaissance agent 400 to deployment environment 202 from server 206. For example, reconnaissance agent 400 may represent a previously installed daemon running in the background of deployment environment 202 that monitors deployment environment 202. Specifically, reconnaissance module 106 may install the daemon within deployment environment 202 in response to a user of deployment environment 202 registering or associating deployment environment 202 as a potential deployment environment for application 130. In this example, the daemon may continuously or periodically (e.g., every 10 seconds, every minute, etc.) monitor deployment environment 202 for properties 208(1)-(N).

In some embodiments, reconnaissance module 106 may perform the reconnaissance analysis by identifying a predetermined set of properties of deployment environment 202. For example, reconnaissance module 106 may identify properties 208(1)-(N) based on a deployment policy (e.g., a policy provided by an IT administrator of application 130). The deployment policy may prompt reconnaissance module 106 to determine several properties related to the security and/or computing capabilities of deployment environment 202. As an example, a deployment policy may involve determining (1) whether deployment environment 202 contains a specific program that supports executing applications included in application containers, (2) the security level of all network connections accessible by deployment environment 202, and/or (3) the country in which deployment environment 202 is located.

Returning to FIG. 3, at step 306 one or more of the systems described herein may determine, based at least in part on the reconnaissance analysis, that the deployment environment meets a predetermined threshold of requirements for securely executing the application. For example, determination module 108 may, as part of server 206 in FIG. 2, determine that deployment environment 202 meets a predetermined threshold of requirements for securely executing application 130 based at least in part on the reconnaissance analysis.

The systems described herein may perform step 306 in a variety of ways. In some examples, determination module 108 may determine that deployment environment 202 meets the predetermined threshold by analyzing properties 208(1)-(N) at deployment environment 202 (e.g., within reconnaissance agent 400). In other examples, determination module 108 may analyze properties 208(1)-(N) at server 206 or an additional computing device. For example, determination module 108 may direct reconnaissance agent 400 to send properties 208(1)-(N) to server 206 after identifying properties 208(1)-(N).

In some examples, determination module 108 may determine that deployment environment 202 meets the predetermined threshold by comparing properties 208(1)-(N) with a deployment policy. For example, as previously described, reconnaissance module 106 may identify properties 208(1)-(N) based on a deployment policy provided by an IT administrator or other manager of application 130. The deployment policy may contain one or more conditions that deployment environment 202 must meet in order for deployment environment 202 to securely execute application 130. As an example, the deployment policy may state that deployment environment 202 must be located within a predetermined geographic region (e.g., a city or state). In addition, the deployment policy may state that all network connections available to deployment environment 202 must require authentication credentials (e.g., the networks must not be open to the public). In an additional example, the deployment policy may state that deployment environment 202 must contain a predetermined amount of Random Access Memory (RAM) (e.g., 4 gigabytes of RAM) in order for application 130 to function properly.

In some embodiments, determination module 108 may determine that the deployment policy requires deployment environment 202 to meet each condition within the deployment policy before deployment environment 202 is deemed capable of securely executing application 130. However, in other embodiments, determination module 108 may determine that the deployment policy requires the completion of only a certain number or percentage (e.g., two out of three) or combination of requirements. Referring to the examples above, the deployment policy may state that (1) deployment environment 202 must contain at least 4 gigabytes of RAM and (2) either deployment environment 202 must be located within the predetermined geographic region or each network connection available to deployment environment 202 must be secured with authentication credentials (but not necessarily both). In general, determination module 108 may determine that the deployment policy contains any number or combination of conditions associated with the security and/or performance capabilities of deployment environment 202.

In some embodiments, determination module 108 may determine that deployment environment 202 conditionally meets the predetermined threshold. For example, determination module 108 may identify at least one security measure that deployment environment 202 is to implement prior to or while executing application 130. Determination module 108 may then block, prevent, or otherwise not allow deployment environment 202 to execute application 130 until deployment environment 202 implements the security measure. As an example, determination module 108 may determine, based on properties 208(1)-(N), that deployment environment 202 contains the necessary software and/or hardware to execute application 130. However, determination module 108 may also determine that a network connection accessible to deployment environment 202 is not secure. As a result, determination module 108 may determine that deployment environment 202 meets the predetermined threshold only if deployment environment 202 blocks the access of application 130 to the insecure network connection. As will be described in greater detail below, the systems described herein may regulate application 130 and/or deployment environment 202 after application 130 is deployed to deployment environment 202 to ensure that application 130 and deployment environment 202 comply with the deployment policy.

Returning to FIG. 3, at step 308 one or more of the systems described herein may transfer the application included in the application container to the deployment environment in response to determining that the deployment environment meets the predetermined threshold. For example, transfer module 110 may, as part of server 206 in FIG. 2, transfer application 130 included in application container 120 to deployment environment 202 in response to the determination that deployment environment 202 meets the predetermined threshold.

The systems described herein may perform step 308 in a variety of ways. In some examples, transfer module 110 may transfer application 130 included in application container 120 in response to receiving a communication from a deployment agent running within deployment environment 202 that indicates that deployment environment 202 meets the predetermined threshold. As an example, FIG. 4 illustrates a deployment agent 402 within deployment environment 202. In this example, deployment agent 402 may be contained within the shell of application container 120 (e.g., along with reconnaissance agent 400). Alternatively, deployment agent 402 may represent a separate agent or software module (e.g., a daemon running in the background of deployment environment 202). Although shown as distinct agents within FIG. 4, reconnaissance agent 400 and deployment agent 402 may alternatively be included within the same agent.

Deployment agent 402 may send the communication to transfer module 110 via network 204 using a variety of protocols (such as TCP/IP protocols or HTTP protocols). In addition, the communication may contain a variety of information, including information detailing which requirements deployment environment 202 meets and/or any security measures that deployment environment 202 must implement in order to meet the predetermined threshold. In response to receiving the communication, transfer module 110 may send application 130 to deployment environment 202. Once deployment environment 202 receives application 130, deployment environment 202 may execute application 130 from within application container 120.

As mentioned above, the systems described herein may regulate application 130 and/or deployment environment 202 while deployment environment 202 executes application 130 to ensure that application 130 complies with the deployment policy. In one example, regulation module 112 may regulate application 130 by monitoring and/or restricting one or more data distribution channels (e.g., messaging services, network connections, external and internal storage devices, etc.) used to distribute data to and from application 130. Regulation module 112 may regulate the data distribution channels in a variety of ways. For example, regulation module 112 may monitor and/or restrict data sent and received via certain ports, networks, messaging services, websites, etc. In addition, regulation module 112 may regulate data distribution channels by intercepting function calls made by the operating system of deployment environment 202. In particular, regulation module 112 may monitor and/or intercept calls associated with input/output functions of application 130.

In some examples, regulation module 112 may impose one or more runtime controls on the execution of application 130. For example, regulation module 112 may allow data to be distributed from application 130 but block data received by application 130 from externals sources (e.g., to prevent attacks distributed over network 204). In some examples, regulation module 112 may require that all data be securely encrypted before being distributed by application 130. Alternatively, regulation module 112 may allow external services to interact with and distribute data to application 130 but prevent application 130 from distributing data to external services (e.g., to prevent inadvertent or malicious distribution of sensitive data stored within application 130).

Additionally or alternatively, regulation module 112 may impose a variety of controls on the network connections available to application 130. In one example, regulation module 112 may completely block a network connection. In some examples, regulation module 112 may prevent a user from accessing certain websites or services used to distribute sensitive data (e.g., email services, social media services, public or insecure cloud-computing platforms, etc.).

In an exemplary embodiment, the shell of application container 120 (e.g., the portion of application container 120 that contains reconnaissance agent 400 and/or deployment agent 402) may regulate all or a portion of the data passed to and from application 130. For example, the shell of application container 120 may serve as a barrier between application 130 and all external computing environments. The shell may be configured to allow certain types of data or communications to pass through the barrier while restricting the flow of potentially harmful or sensitive information. Additionally or alternatively, regulation module 112 may regulate data distribution channels of application 130 via a separate agent or software module within deployment environment 202.

As an example of regulating distributed data, FIG. 4 illustrates a restricted communication 404 and restricted data 406. In this example, regulation module 112 may prevent restricted communication 404 from reaching application 130 within application container 120 in response to the determination that restricted communication 404 was sent from an unknown source and/or sent to a restricted port. In addition, regulation module 112 may prevent restricted data 406 from being distributed to outside application container 120 in response to the determination that restricted data 406 contains sensitive information (e.g., financial records, client information, etc.). In general, regulation module 112 may monitor and/or restrict any potentially harmful or insecure data or communication that passes through application container 120. By regulating the actions (in particular, the input/output activities) of application 130 while deployment environment 202 executes application 130, regulation module 112 may ensure that a user of deployment environment 202 does not compromise the security of sensitive data stored within application 130 but still prevents attackers from accessing sensitive data within application 130.

In some examples, regulation module 112 may regulate application 130 by directing application 130 to comply with the deployment policy. For example, application 130 may be configured to accept input that indicates restrictions or limitations imposed by the deployment policy. In an exemplary embodiment, regulation module 112 may, based on the results of the reconnaissance analysis in view of the deployment policy, direct application 130 to switch to a more conservative mode of operation. This more conservative mode of operation may limit the actions of application 130 according to any of the restrictions discussed above or in any additional manner.

Furthermore, application 130 may impose restrictions on its own input/output without requiring direction from regulation module 112. For example, once deployed within deployment environment 202, application 130 may send a request to reconnaissance module 106 and/or reconnaissance agent 400 to receive the results of the reconnaissance analysis. Based on the results of the reconnaissance analysis in view of the deployment policy, application 130 may decide to implement one or more restrictions or limitations on its own actions in order to comply with the deployment policy. In this way, application 130 may autonomously and/or automatically ensure that sensitive data within application 130 is handled securely.

In some embodiments, the disclosed systems and methods may gather information collected from multiple reconnaissance analyses of one or more deployment environments in order to regulate subsequent deployments of application 130. For example, reconnaissance module 106 may perform an additional reconnaissance analysis on at least one additional deployment environment (e.g., a deployment environment associated with an additional employee of an organization that manages application 130). Reconnaissance module 106 may then accumulate information obtained from the additional reconnaissance analysis, as well as information obtained from the reconnaissance analysis of deployment environment 202. Reconnaissance module 106 may store the information from multiple reconnaissance analyses within server 206 or an additional database.

In an exemplary embodiment, storing information obtained from multiple reconnaissance analyses in a single database may enable IT administrators to create a global map of the hygiene and/or security of all deployed application containers. In some examples, the global map of deployed application containers may enable IT administrators to operate a centralized management platform that more effectively allocates resources for deploying application containers (e.g., by optimally scheduling deployments to avoid excessive resource consumption). Additionally or alternatively, analyzing multiple deployments of application 130 may enable IT administrators to identify security breaches or potential security threats in connection with deploying application 130 to unknown environments. As such, the systems described herein may produce more effective security policies in order to safely regulate deployments of application 130.

As an example, analyzing multiple deployments of application 130 may enable the disclosed methods to make deployment recommendations to users of application 130. For example, application 130 and one or more additional applications may be managed by a single enterprise. Users within the enterprise may be able to deploy multiple applications to a variety of deployment environments that are also managed by the enterprise. In some examples, the computing devices, networks, and/or servers used to deploy applications within the enterprise may experience varying loads (e.g., due to varying numbers of application deployments and/or additional tasks). As such, determination module 108 may consider the cost (e.g., network and computing resource consumption) of deploying an application to a deployment environment within the enterprise.

For example, determination module 108 may determine that a potential deployment environment within an enterprise meets the predetermined threshold of requirements for securely executing application 130. However, determination module 108 may also determine that deploying application 130 to the potential deployment environment would impose excessive strain on the network and/or servers used for the deployment. Specifically, determination module 108 may determine that a user is attempting to deploy a resource-intensive application during a period of heavy network use (e.g., during business hours). As a result, determination module 108 may recommend deploying application 130 to a different deployment environment and/or deploying a different application (e.g., a less resource-intensive application) to the deployment environment.

In some examples, determination module 108 may present deployment recommendations to a user and/or administrator of application 130 such that the user or administrator retains control over the deployment of applications within an enterprise. However, in other examples, determination module 108 may automatically schedule deployments in order to optimize the resource consumption of deployed applications.

As explained above, prior to shipping an application within an application container to a deployment environment, a server or computing device may analyze the deployment environment to determine whether the deployment environment is capable of securely executing the application. For example, the server may identify one or more properties of the deployment environment and compare the properties with a deployment policy to determine whether the deployment environment meets a predetermined threshold of safety and/or performance requirements. If the deployment environment meets the predetermined threshold of requirements, the server may transfer the application included in the application container to the deployment environment for execution. In addition, the server may monitor and/or restrict communications and/or data flows to and from the application within the application container. For example, the server may configure the application container to serve as a barrier between the application and any external computing environments to ensure that the application complies with a deployment policy.

Figure 5:
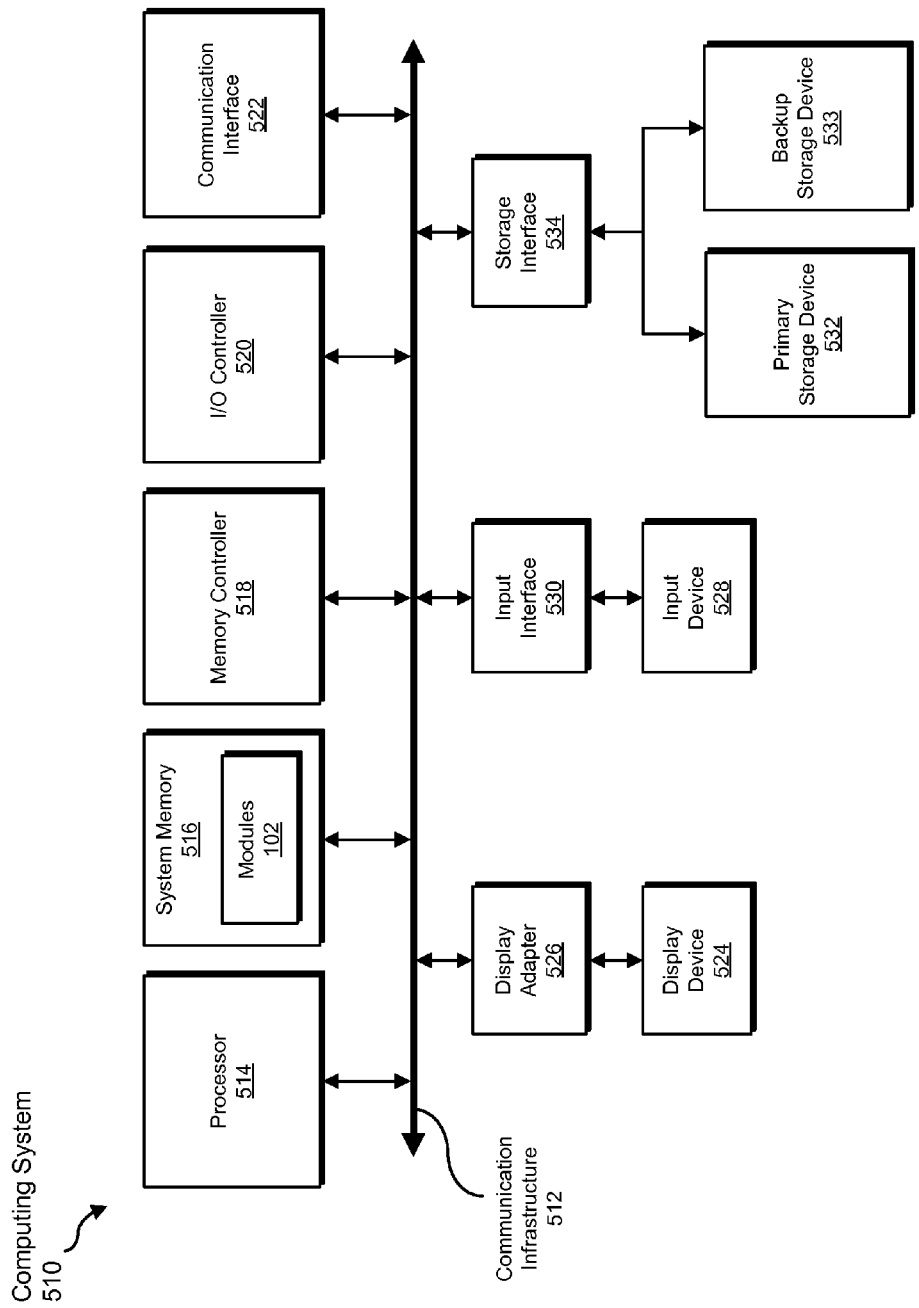
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, RAM, Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
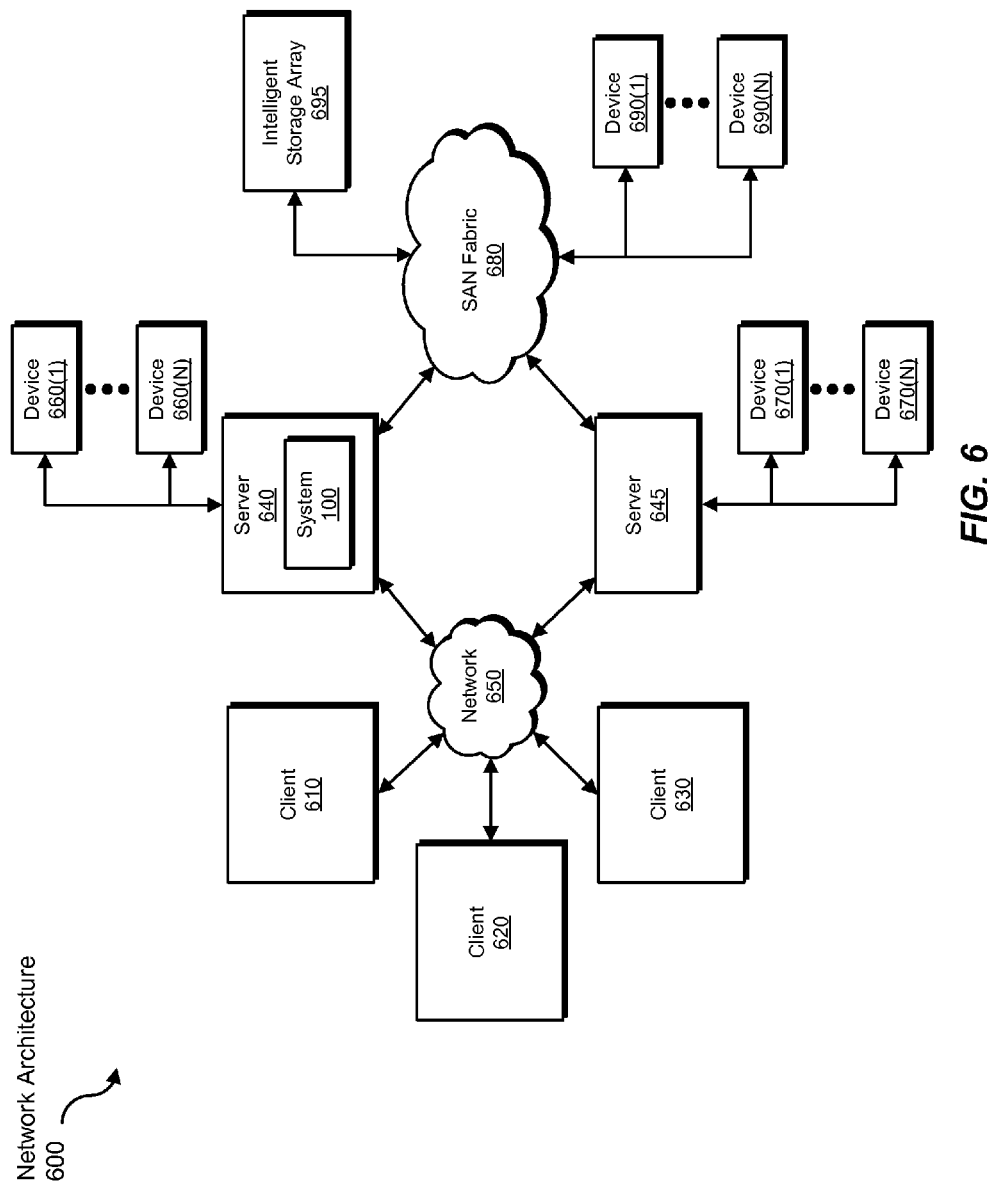
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for deploying applications included in application containers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive properties of a deployment environment to be transformed, transform the properties, output a result of the transformation to the deployment environment, use the result of the transformation to regulate an application within the deployment environment, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for deploying applications included in application containers, at least a portion of the computer-implemented method being performed by a computing device comprising at least one processor, the computer-implemented method comprising:
   identifying an application container that includes an application and facilitates transferring the application to at least one deployment environment;
   shipping, to the at least one deployment environment, a shell of the application container that includes a reconnaissance agent and does not include the application;
   performing, by the reconnaissance agent included in the shell of the application container, a reconnaissance analysis on the at least one deployment environment by identifying at least one property of the at least one deployment environment;
   determining, based at least in part on the reconnaissance analysis, that the at least one deployment environment meets a predetermined threshold of requirements for securely executing the application; and
   in response to determining that the at least one deployment environment meets the predetermined threshold of requirements, transferring the application included in the application container to the at least one deployment environment for deployment within the shell of the application container.

2. The computer-implemented method of claim 1, wherein performing the reconnaissance analysis on the at least one deployment environment comprises monitoring the at least one deployment environment via a daemon running in the background of the at least one deployment environment.

3. The computer-implemented method of claim 1, wherein the at least one property of the at least one deployment environment comprises a property of at least one of:
   hardware operating within the at least one deployment environment;
   software operating within the at least one deployment environment;

network connections accessible by the at least one deployment environment;
services accessible by the at least one deployment environment; and
a geographic location of the at least one deployment environment.

4. The computer-implemented method of claim 1, wherein determining that the at least one deployment environment meets the predetermined threshold of requirements comprises:
comparing the at least one property of the at least one deployment environment with a deployment policy; and
determining, based at least in part on the comparison of the at least one property of the at least one deployment environment with the deployment policy, that the at least one deployment environment meets the predetermined threshold of requirements.

5. The computer-implemented method of claim 1, wherein determining that the at least one deployment environment meets the predetermined threshold of requirements comprises:
identifying at least one security measure that the at least one deployment environment is to implement prior to executing the application included in the application container; and
ensuring that the at least one deployment environment implements the at least one security measure prior to executing the application included in the application container.

6. The computer-implemented method of claim 1, wherein transferring the application included in the application container to the at least one deployment environment comprises:
receiving a communication from a deployment agent running within the at least one deployment environment that indicates that the at least one deployment environment meets the predetermined threshold of requirements; and
transferring the application to the at least one deployment environment in response to receiving the communication.

7. The computer-implemented method of claim 1, further comprising regulating the application included in the application container after transferring the application included in the application container to the at least one deployment environment.

8. The computer-implemented method of claim 7, wherein regulating the application included in the application container comprises restricting at least one of:
the application's access to a network connection;
access to the application by an external service;
data transferred to the application from outside the application container; and
data transferred from the application to outside the application container.

9. The computer-implemented method of claim 7, wherein regulating the application included in the application container comprises directing the application to comply with a deployment policy.

10. The computer-implemented method of claim 1, further comprising:
performing an additional reconnaissance analysis on at least one additional deployment environment;
storing information obtained from the reconnaissance analysis performed on the at least one deployment environment and the additional reconnaissance analysis performed on the at least one additional deployment environment; and
using the information obtained from both the reconnaissance analysis and the additional reconnaissance analysis to regulate at least one subsequent deployment of the application.

11. The computer-implemented method of claim 10, wherein regulating the at least one subsequent deployment of the application comprises making a recommendation to a user of the application on how to deploy the application to a potential deployment environment.

12. The computer-implemented method of claim 1, wherein determining that the at least one deployment environment meets the predetermined threshold of requirements comprises determining that the at least one deployment environment contains a specific program that supports executing applications included in application containers.

13. The computer-implemented method of claim 1, wherein determining that the at least one deployment environment meets the predetermined threshold of requirements comprises determining that a security level of all network connections accessible by the at least one deployment environment meets another predetermined threshold of requirements.

14. A system for deploying applications included in application containers, the system comprising:
an identification module, stored in a memory, that identifies an application container that includes an application and facilitates transferring the application to at least one deployment environment;
a reconnaissance module, stored in the memory, that:
ships, to the at least one deployment environment, a shell of the application container that includes a reconnaissance anent and does not include the application; and
performs, by the reconnaissance agent included in the shell of the application container, a reconnaissance analysis on the at least one deployment environment by identifying at least one property of the at least one deployment environment;
a determination module, stored in the memory, that determines, based at least in part on the reconnaissance analysis, that the at least one deployment environment meets a predetermined threshold of requirements for securely executing the application;
a transfer module, stored in the memory, that transfers the application included in the application container to the at least one deployment environment for deployment within the shell of the application container in response to the determination that the at least one deployment environment meets the predetermined threshold of requirements; and
at least one processor that executes the identification module, the reconnaissance module, the determination module, and the transfer module.

15. The system of claim 14, wherein the reconnaissance module performs the reconnaissance analysis on the at least one deployment environment by monitoring the at least one deployment environment via a daemon running in the background of the at least one deployment environment.

16. The system of claim 14, wherein the at least one property of the at least one deployment environment comprises a property of at least one of:
hardware operating within the at least one deployment environment;
software operating within the at least one deployment environment;
network connections accessible by the at least one deployment environment;

services accessible by the at least one deployment environment; and a geographic location of the at least one deployment environment.

17. The system of claim 14, wherein the determination module determines that the at least one deployment environment meets the predetermined threshold of requirements by:

comparing the at least one property of the at least one deployment environment with a deployment policy; and determining, based at least in part on the comparison of the at least one property of the at least one deployment environment with the deployment policy, that the at least one deployment environment meets the predetermined threshold of requirements.

18. The system of claim 14, wherein the determination module determines that the at least one deployment environment meets the predetermined threshold of requirements by:

identifying at least one security measure that the at least one deployment environment is to implement prior to executing the application included in the application container; and ensuring that the at least one deployment environment implements the at least one security measure prior to executing the application included in the application container.

19. The system of claim 14, wherein the transfer module transfers the application included in the application container to the at least one deployment environment by:

receiving a communication from a deployment agent running within the at least one deployment environment that indicates that the at least one deployment environment meets the predetermined threshold of requirements; and transferring the application to the at least one deployment environment in response to receiving the communication.

20. A non-transitory computer-readable medium storing one or more computer-executable instructions that, when executed by at least one processor of a computing device, cause the computing device to:

identify an application container that includes an application and facilitates transferring the application to at least one deployment environment;

ship, to the at least one deployment environment, a shell of the application container that includes a reconnaissance agent and does not include the application;

perform, by the reconnaissance agent included in the shell of the application container, a reconnaissance analysis on the at least one deployment environment by identifying at least one property of the at least one deployment environment;

determine, based at least in part on the reconnaissance analysis, that the at least one deployment environment meets a predetermined threshold of requirements for securely executing the application; and in response to determining that the at least one deployment environment meets the predetermined threshold of requirements, transfer the application included in the application container to the at least one deployment environment for deployment within the shell of the application container.

\* \* \* \* \*

UNITED STATES PATENT AND TRADEMARK OFFICE
CERTIFICATE OF CORRECTION

| | | |
|---|---|---|
| PATENT NO. | : 9,116,768 B1 | Page 1 of 1 |
| APPLICATION NO. | : 14/549218 | |
| DATED | : August 25, 2015 | |
| INVENTOR(S) | : Sanjay Sawhney et al. | |

It is certified that error appears in the above-identified patent and that said Letters Patent is hereby corrected as shown below:

In The Claims

Claim 14, at column 22, lines 30 to 32, should read:

ships, to the at least one deployment environment, a shell of the application container that includes a reconnaissance agent and does not include the application; and Signed and Sealed this
First Day of March, 2016

Michelle K. Lee
*Director of the United States Patent and Trademark Office*